United States Patent
Muret et al.

(10) Patent No.: US 8,150,983 B2
(45) Date of Patent: *Apr. 3, 2012

(54) SYSTEM AND METHOD FOR TRACKING UNIQUE VISITORS TO A WEBSITE

(75) Inventors: Paul N. Muret, Los Altos, CA (US);
Hui Sok Moon, Campbell, CA (US);
Jonathon A. Vance, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/961,197

(22) Filed: Dec. 6, 2010

(65) Prior Publication Data

US 2011/0078321 A1    Mar. 31, 2011

Related U.S. Application Data

(63) Continuation of application No. 12/266,934, filed on Nov. 7, 2008, now Pat. No. 7,849,202, which is a continuation of application No. 10/429,721, filed on May 6, 2003, now abandoned.

(60) Provisional application No. 60/377,616, filed on May 6, 2002.

(51) Int. Cl.
*G06F 15/16* (2006.01)
*G06F 12/00* (2006.01)

(52) U.S. Cl. ........................................ 709/228; 709/203

(58) Field of Classification Search .......... 709/217–219, 709/203, 225–229
See application file for complete search history.

(56) References Cited

U.S. PATENT DOCUMENTS

| | | | |
|---|---|---|---|
| 5,511,190 A | 4/1996 | Sharma et al. | |
| 5,675,510 A | 10/1997 | Coffey et al. | |
| 5,689,416 A | 11/1997 | Shimizu et al. | |
| 5,727,129 A | 3/1998 | Barrett et al. | |
| 5,732,218 A | 3/1998 | Bland et al. | |
| 5,787,253 A | 7/1998 | McCreery et al. | |
| 5,796,952 A | 8/1998 | Davis et al. | |
| 5,878,223 A | 3/1999 | Becker et al. | |
| 5,951,642 A | 9/1999 | Onoe et al. | |
| 6,112,238 A | 8/2000 | Boyd et al. | |
| 6,115,742 A | 9/2000 | Franklin et al. | |
| 6,122,639 A | 9/2000 | Babu et al. | |

(Continued)

FOREIGN PATENT DOCUMENTS

EP            1026608 A2     9/2000

OTHER PUBLICATIONS

Home web page for Analog logile analyzer (www.analog.cx).

(Continued)

*Primary Examiner* — Zarni Maung
(74) *Attorney, Agent, or Firm* — Fish & Richardson P.C.

(57) ABSTRACT

A system and method for analyzing traffic to a website is provided that is based on log files and that uses both server-side and client-side information channeled through one source to create a more complete picture of activity to a website. In one preferred embodiment, a sensor code is embedded in a requested web page, and sends information back to the web server where the website resides. This additional information is logged along with normal requests.

26 Claims, 13 Drawing Sheets

U.S. PATENT DOCUMENTS

| | | | |
|---|---|---|---|
| 6,249,813 B1 | 6/2001 | Campion et al. | |
| 6,256,671 B1 | 7/2001 | Strentzsch et al. | |
| 6,332,158 B1 | 12/2001 | Risley et al. | |
| 6,393,479 B1 | 5/2002 | Glommen et al. | |
| 6,411,966 B1 | 6/2002 | Kwan et al. | |
| 6,427,170 B1 | 7/2002 | Sitaraman et al. | |
| 6,430,623 B1 | 8/2002 | Alkhatib | |
| 6,442,602 B1 | 8/2002 | Choudhry | |
| 6,449,657 B2 | 9/2002 | Stanbach et al. | |
| 6,473,802 B2 | 10/2002 | Masters | |
| 6,560,634 B1 | 5/2003 | Broadhurst | |
| 6,661,431 B1 | 12/2003 | Stuart et al. | |
| 6,725,269 B1 | 4/2004 | Megiddo | |
| 6,961,759 B2 | 11/2005 | Brown et al. | |
| 7,849,202 B2 * | 12/2010 | Muret et al. | 709/228 |
| 2009/0204704 A1 * | 8/2009 | Muret et al. | 709/224 |

OTHER PUBLICATIONS

Mogul and Leach. "RFC 2227, Simple Hit-Metering and Usage-Limiting for HTTP," Network Working Group, Oct. 1997 [on-line] [Retrieved from the internet: http://armware.dk/RFC/rfc/rfc2227.html], May 21, 2010, 34 pages.

"Power to the People," Quantified Systems, Inc. (Sep. 1, 1999).

"Urchin 2 Installation and Administration Guide for UNIX," Quantified Systems Inc., pp. 1-1 through 7-2 (Sep. 1, 1999).

"Urchin ISP 1.4 for UNIX Installation and Administration Guide," Quantified Web Systems Inc., pp. 1-1 through 6-5 (Dec. 1, 1997).

* cited by examiner

SYSTEM AND METHOD FOR TRACKING UNIQUE VISITORS TO A WEBSITE

This application is a continuation (and claims the benefit of priority under 35 USC 120) of U.S. patent application Ser. No. 12/266,934 filed Nov. 7, 2008 (now U.S. Pat. No. 7,849, 202), which is a continuation of U.S. patent application Ser. No. 10/429,721, filed May 6, 2003 (now abandoned), which claims the benefit of U.S. Provisional Patent Application No. 60/377,616 filed May 6, 2002. The entire disclosure of each of these applications is incorporated by reference.

BACKGROUND OF THE INVENTION

1. Field of the Invention

The present invention relates to a system and method for analyzing traffic to a website.

2. Background of the Related Art

Programs are available for analyzing traffic to a website. One such program is described in co-pending U.S. patent application Ser. No. 09/679,297, filed Oct. 4, 2000, entitled "System and Method for Monitoring and Analyzing Internet Traffic", which is incorporated herein by reference for all purposes and is assigned in common with the present application. These systems can be generally classified into two categories: log-based tools and Internet-based tools, with the aforementioned system being an example of a log-based tool.

Log-based tools for analyzing traffic to a website are generally operated by the owner of the website or their hosting provider. The source of raw data for log-based tools typically comes from the web servers hosting the website being analyzed. As visitors to the website request web pages, files, and embedded content, the web servers hosting the website are typically configured to automatically make entries into one or more log files describing each request. Log-based tools will read these log files as the source of raw data for the analysis.

Internet-based tools, such as that described in U.S. patent Ser. No. 09/326,475, entitled "Internet Website Traffic Flow Analysis", by C. Glommen and B. Barrelet, are generally operated by the owner of the tool and provided as a service that website owners can subscribe to. To generate a source of data for the service, the website owner will typically copy JavaScript code provided by the service provider into the content of the website being analyzed. As visitors to the website request web pages, the embedded JavaScript code collects information and then calls a second web server operated by the service provider, transmitting the collected information.

Both log-based tools and Internet-based tools have their drawbacks. One of the drawbacks of log-based tools is that some of the traffic generated by visitors to the website may be intercepted by various caching systems—designed to improve Internet performance—before those requests get to the web server hosting the website. When this happens, the web server hosting the website never receives the request and therefore, does not make an entry into the log file leaving the data incomplete. Internet-based tools, on the other hand, benefit from being triggered by the visitor's web browser, so that even if the request is handled by a caching system, the JavaScript code in the content will still trigger the transmitting of data to the service provider.

One of the shortcomings of Internet-based tools is their inability to record and analyze requests for non JavaScript enabled content such as PDF documents and other downloads. Because these file formats do not include any JavaScript capabilities, these requests never trigger the transmitting of data to the service provider. However, log-based tools will typically see these requests since they are still handled by the web server hosting the website. In general, Internet-based tools will only track content that includes scripting abilities such as HTML, whereas log-based tools can see other content requests as well.

One of the difficulties with traditional log based systems is tacking unique visitors, sessions, and loyalty metrics. Being able to uniquely identify a new visitor and a new session can be difficult with the increasing use of proxy systems that can mask IP addresses. And even if a visitor and session is uniquely identified, scanning potentially huge volumes of data for previous sessions can be a barrier to calculating visitor loyalty.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

In view of the above problems in the art, the present invention provides a system and method for analyzing traffic to a website that is based on log files, that uses both server-side and client-side information channeled through one source to create a more complete picture of activity to a website. Client-side only systems, such as Internet-based tools, will miss content requested by non cookie-enabled scriptable browsers and content requested for non-scriptable file formats. Server-side only systems, such as prior log-based tools, will miss content intercepted by caching systems and valuable client-side data. The current invention is a log-based tool that augments the log file with additional entries from a client-side sensor, creating a more complete picture of total activity on a website. Unlike Internet-based tools that use code to send information to a second web server controlled by the service provider, the sensor code of the present invention sends the information back to the web server where the website resides. This additional information is logged along with normal requests.

In one embodiment of the present invention, log files containing normal visitor requests and the sensor code requests are analyzed to create a complete picture of visitor traffic space. The system and method of the present invention preferably uses multiple cookies in the sensor code with different expirations in order to determine new sessions. The system and method of the present invention preferably uses multiple timestamps to keep track of unique visitors and the time between returning sessions space. The system and method of the present invention preferably uses a two dimensional data table to store the number of days between returning sessions and uses this data table to determine the number of unique visitors during any date range.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
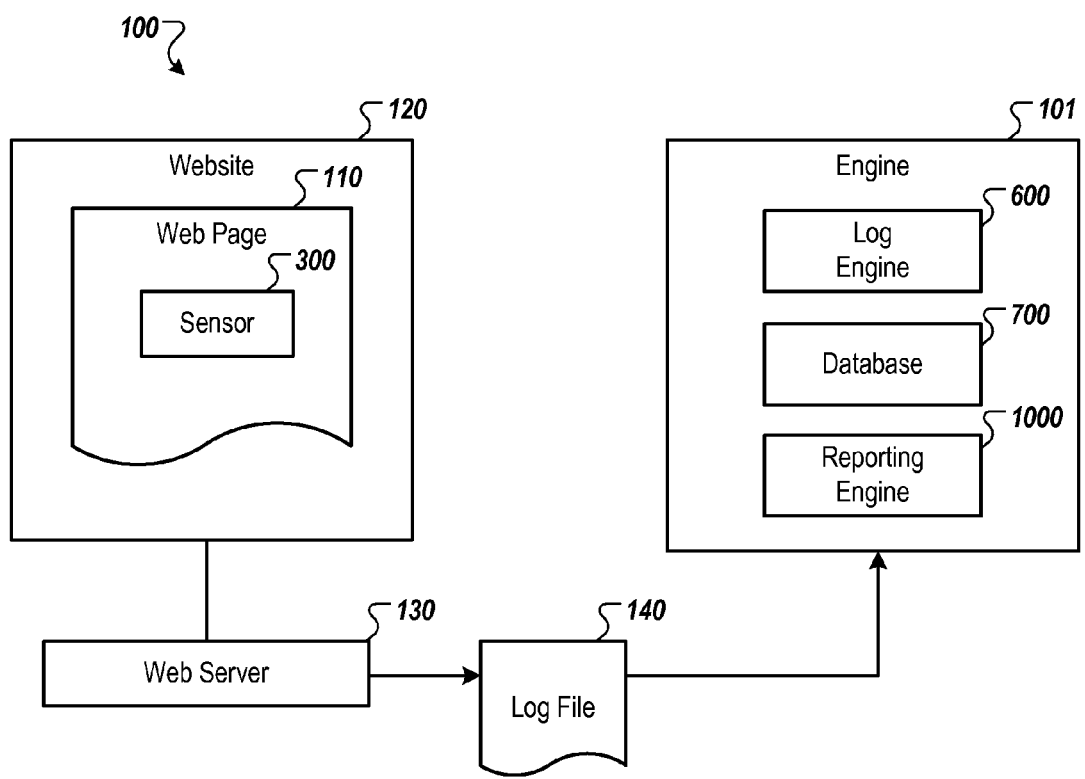
FIG. 1 is a schematic diagram of a system for analyzing traffic to a website, in accordance with the present invention.

FIG. 1 illustrates a system 100 for analyzing traffic to a website, in accordance with one preferred embodiment of the present invention. The system 100 comprises a sensor 300 and an engine 101. The engine 101 preferably comprises a log engine 600, a database 700, and a reporting engine 1000.

The sensor 300 is installed on one or more web pages 110 which are part of a website 120. The website 120 resides on a web server 130 which delivers the web pages 110 as they are requested. The web server 130 makes entries into a log file 140 for each request received. The log file 140 is processed by the log engine 600 and the results are stored in the database 700 which can be delivered as reports by the reporting engine 1000.

Figure 2:
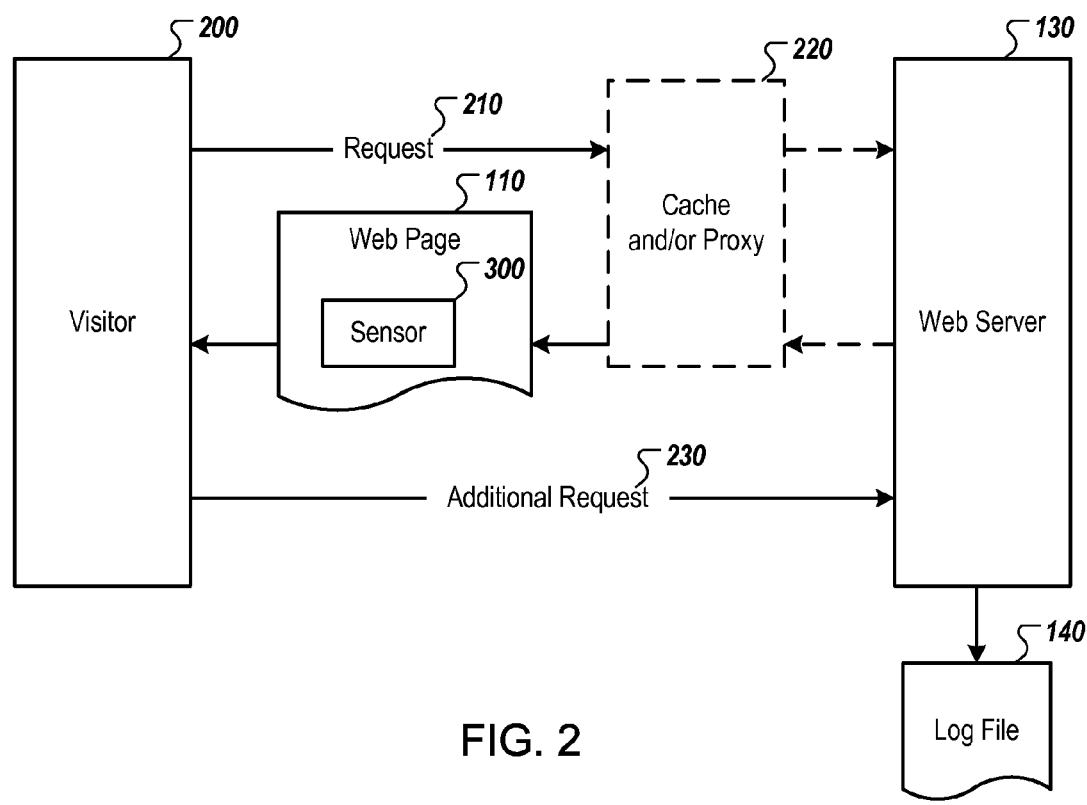
FIG. 2 is a flowchart and schematic diagram illustrating the interaction between a visitor and a website using the system of FIG. 1.

FIG. 2 shows a flowchart and schematic diagram of the interaction between a visitor 200 and the web server 130 in the system of FIG. 1. A visitor 200 makes a request 210 for the web page 110 belonging to the website 120 (FIG. 1). This request 210 is generally made using a web browser. The visitor's request 210 may be served by the web server 130, or it may intercepted by a cache/proxy system 220. Caching and proxying are common technologies used by browsers and Internet service providers to provide increased performance and resource utilization. If the request 210 is handled by the cache/proxy system 220, the web page 110 may be delivered directly from the cache/proxy system 220. Thus, the request 210 may never be received by the web server 130. Since the web server 130 makes entries into the log file 140 for each received request, the request 210 may not be entered into the log file 140 if it is handled by the cache/proxy system 220.

However, the web page 110 that is delivered by either the web server 130 or the cache/proxy system 220 contains the sensor 300. When the web page 110 is received by the visitor 200, the sensor 300 will make an additional request 230, which is adapted to go directly to the web server 130. The additional request 230 will contain information about the original request 210. The additional request 230 is handled by the web server 130, and a corresponding entry is made in the log file 140. One feature of the present invention is the sending of the additional request 230 back to the original web server 130 where the website 120 resides. The request is not sent to a second web server operated by a service provider. Thus, the log file 140 will contain entries caused by both original requests 210 and additional requests 230.

Figure 3:
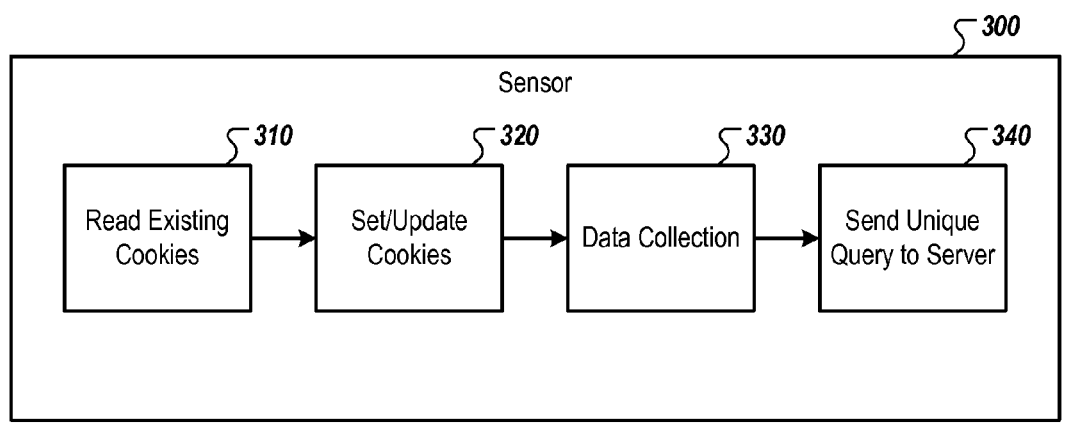
FIG. 3 is a flowchart and schematic diagram illustrating a preferred control routine for the sensor shown in FIG. 1.

FIG. 3 is a flowchart and schematic diagram of a preferred control routine for the sensor 300. The control routine is preferably written in JavaScript, which is widely understood by most web browsers. When the web page 110 is loaded into a visitor's web browser, the control routine of the sensor 300 is executed. The control routine begins by reading existing cookies in step 310. The contents of the cookies provide information on the state of the current visitor, including identification and session information. Based on the existing information, the cookies are set or updated in step 320. This process is described in more detail below. Next, at step 330, data is collected from the visitor's browser. This data may include client-side browser parameters such as screen resolution.

In the final step 340, the control routine constructs a unique query which is sent back to the original web server 130 as the additional request 230. The construction of the unique query preferably includes a random or unique number and data collected from the browser and cookies from the previous steps. In particular, the unique query preferably includes a reference to the original web page 110 that triggered the execution of the control routine of the sensor 300. In this manner, the additional request 230 contains information about the original request 210 so that the system 100 can determine what the original request 210 was even though the original request 210 may not be in the log file 140 as discussed previously. The query is preferably sufficiently unique such that it will not be intercepted by the cache/proxy system 220.

Figure 4:
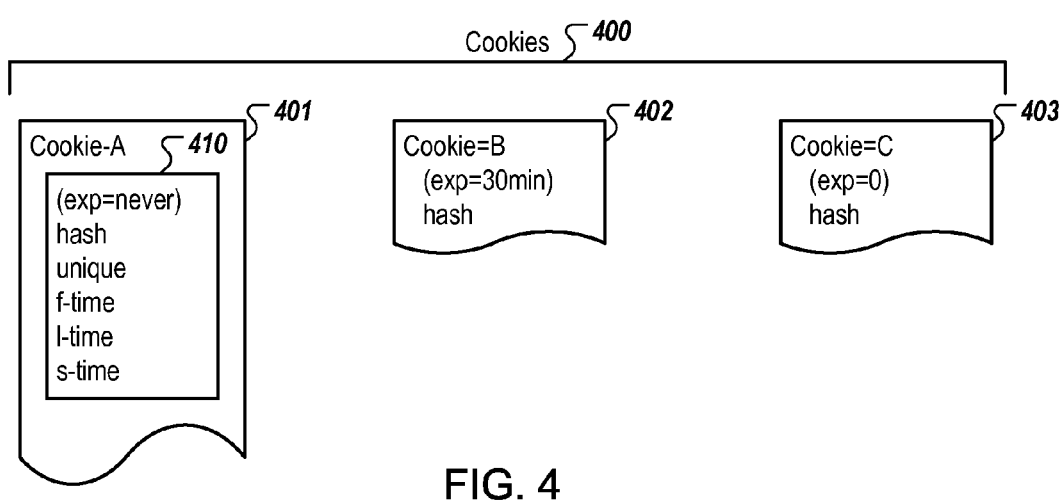
FIG. 4 is a diagram of a preferred embodiment of cookies that are used by the control routine of FIG. 3.

FIG. 4 shows a block diagram of one preferred embodiment of the cookies 400 that are used by the control routine. The embodiment of FIG. 4 shows three cookies 400. The first, Cookie-A 401, is a persistent cookie that is set to never expire or to at least have a very long expiration time. This cookie 401 contains certain variables 410 that provide for unique identification, session determination, and loyalty calculations. Cookie-B 402 and Cookie-C 403 use relative expirations of 30 minutes and zero to allow the detection of a new session to occur. If the visitor 200 closes their browser, Cookie-C will expire. If the visitor 200 is inactive for 30 minutes, Cookie-B will expire. It should be appreciated that other combinations of cookies and expiration times can be used, while still falling within the scope of the present invention, as long as multiple cookies with varying expirations are used to assist in the determination of a new visitor session. The steps within the control routine of FIG. 3 will set and update this state information, as described further below.

The preferred variables 410 in the cookies 400 will now be described. The "hash" variable is used to select the appropriate cookies in the case where multiple sets of cookies 400 appear. Multiple sets can appear if multiple websites have overlapping domains. The "hash" variable provides an identifier to select the correct set of cookies 400 for the website 120 of interest.

Another purpose of the variables 410 is to provide a means for uniquely identifying visitors. This is preferably accomplished by using a combination of the "unique" variable and the "f-time" variable. When a visitor 200 visits the website 120 for the first time, the cookies are initialized, as will be described in mate detail below. During this initialization, the "unique" variable is set to a random number and the "f-time" variable to the current time. A combination of these two variables is used as a key for uniquely identifying visitors. While a variety of variables could be used to build a unique key, one benefit of the sensor 300 is that the key is carried by the visitor 200 in the cookies 400 and is not affected by proxy servers which mask IP addresses.

Another purpose of the variables 410 is to provide a means for determining certain loyalty metrics including whether or not the visitor is new or returning and the amount of time that has elapsed since their last session if any. To accomplish this, three timestamp variables are preferably used: "f-time", "l-time", and "s-time" that record the timestamp of the first session, last session, and current session, respectively. The difference between the "l-time" and the "s-time" variables allows the system 100 to determine the return frequency of the visitor 200. This is described in more detail below, with reference to FIG. 8.

Figure 5:
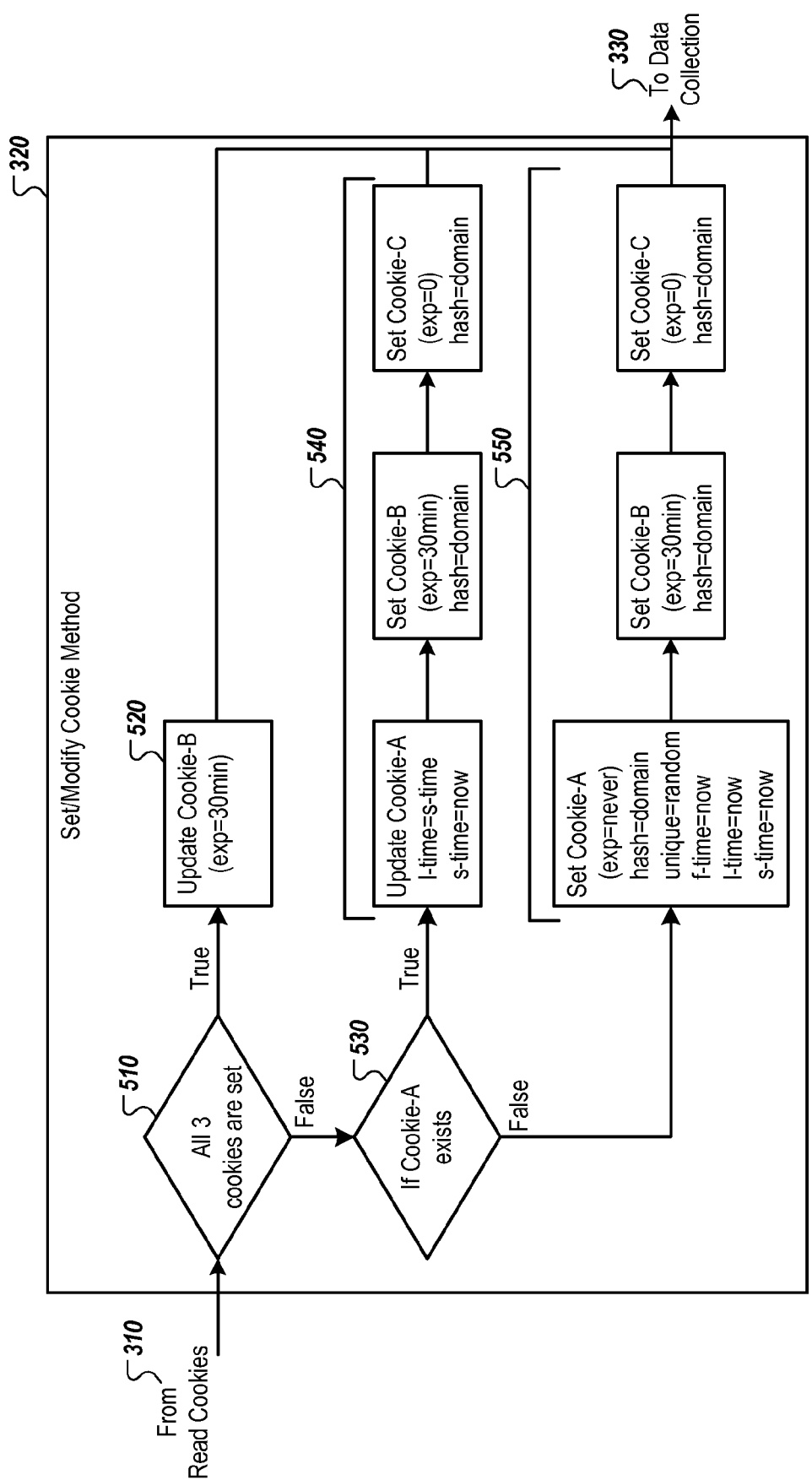
FIG. 5 is a flowchart and schematic diagram of a preferred control routine for the set/update cookies step of in FIG. 3.

FIG. 5 is a flowchart and schematic diagram of a preferred control routine for the set/update cookies step 320 of the control routine of FIG. 3. The control routine begins in the upper left of the schematic and ends in the lower tight. In the first step 510, it is determined if all three cookies 400 exist. If they do exist, then only the expiration of Cookie-B is updated in step 520 to thirty minutes in the future. Otherwise, the routine continues to check for the existence of Cookie-A in step 530. If Cookie-A exists then a series of updates occur at step 540: the "l-time" variable of Cookie-A is set to the value of "s-time", and "s-time" is set to the current clock time of the browser; Cookie-B is initialized with the appropriate expiration and bash value; and Cookie-C is initialized with the appropriate expiration and hash value. If Cookie-A does not exist in step 530, control moves to the series of updates at step 550, where all three cookies are initialized. In Cookie-A, a unique number is selected for this visitor, and all three timestamps are set to the current time. The "hash" variable is set to an identifier of the website domain, and expiration is set to the maximum allowable. Cookie-B and Cookie-C are initialized with appropriate expirations and hash values. The use of the three variables "f-time", "l-time", and "s-time" in calculations is described further below. An aspect of the current' invention is that the cookies 400 are set and updated within the sensor 300, which generally runs within the browser of the visitor 200. Thus, the cookies 400 are set on the client-side of the system 100 instead of the server-side.

Although not shown, the control routine of FIG. 5 could optionally look at the request itself to see if cookie data has been passed from another website. This technique would allow two websites which are linked together to share cookie information.

Figure 6:
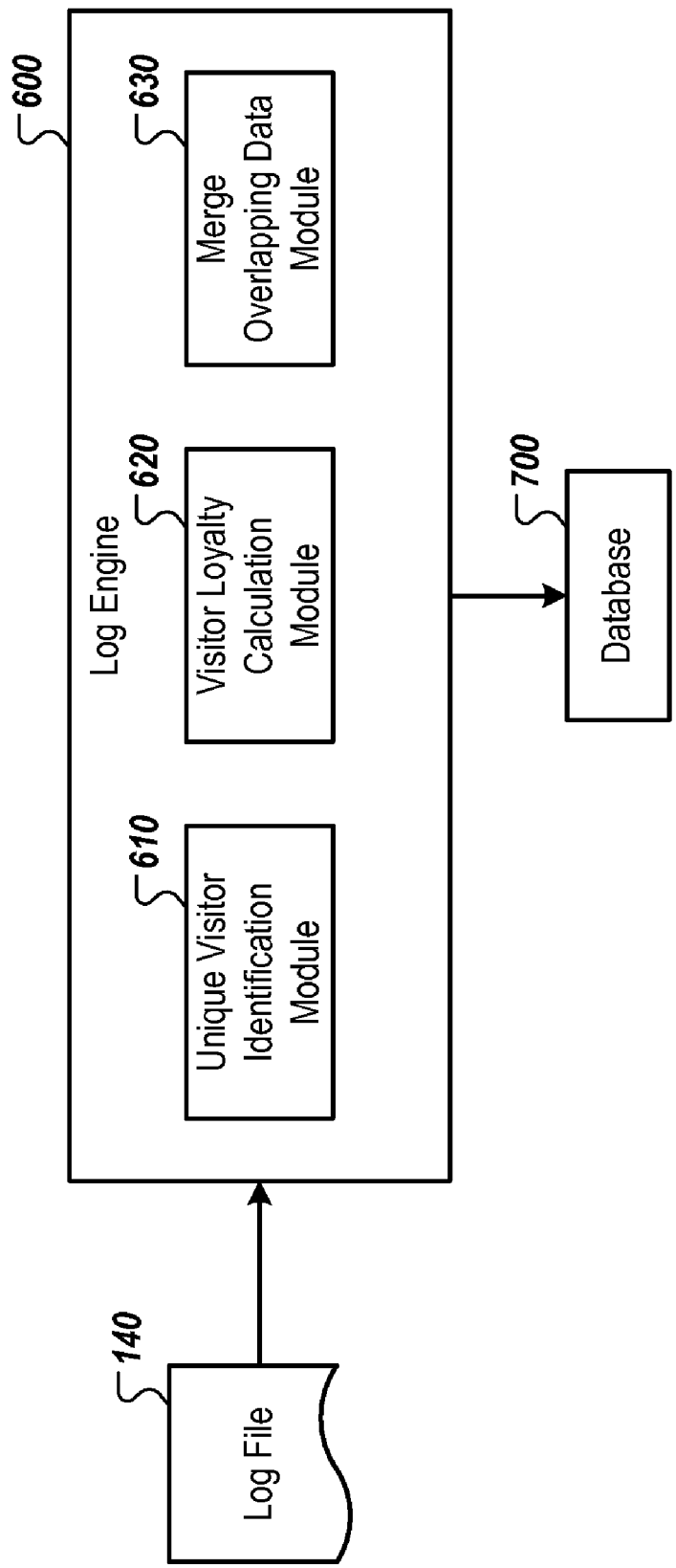
FIG. 6 is a partial block diagram and flowchart of a preferred embodiment of the log engine shown in FIG. 1.

FIG. 6 is a partial block diagram and flowchart of one preferred embodiment of the log engine 600. In general, the log engine 600 is responsible for processing the log file 140, which contains information from the web server 130 in response to the requests 210 and additional requests 230. In general, as the log engine 600 processes the log file 140, it will update the database 700. However, the log engine 600 may create reports or summaries directly, while still falling within the scope of the present invention.

The log engine 600 preferably includes three modules: a Unique Visitor Identification module 610, a Visitor Loyalty Calculation module 620, and a Merge Overlapping Data module 630. These modules will be described in more detail below, after describing the data structures involved.

Figure 7:
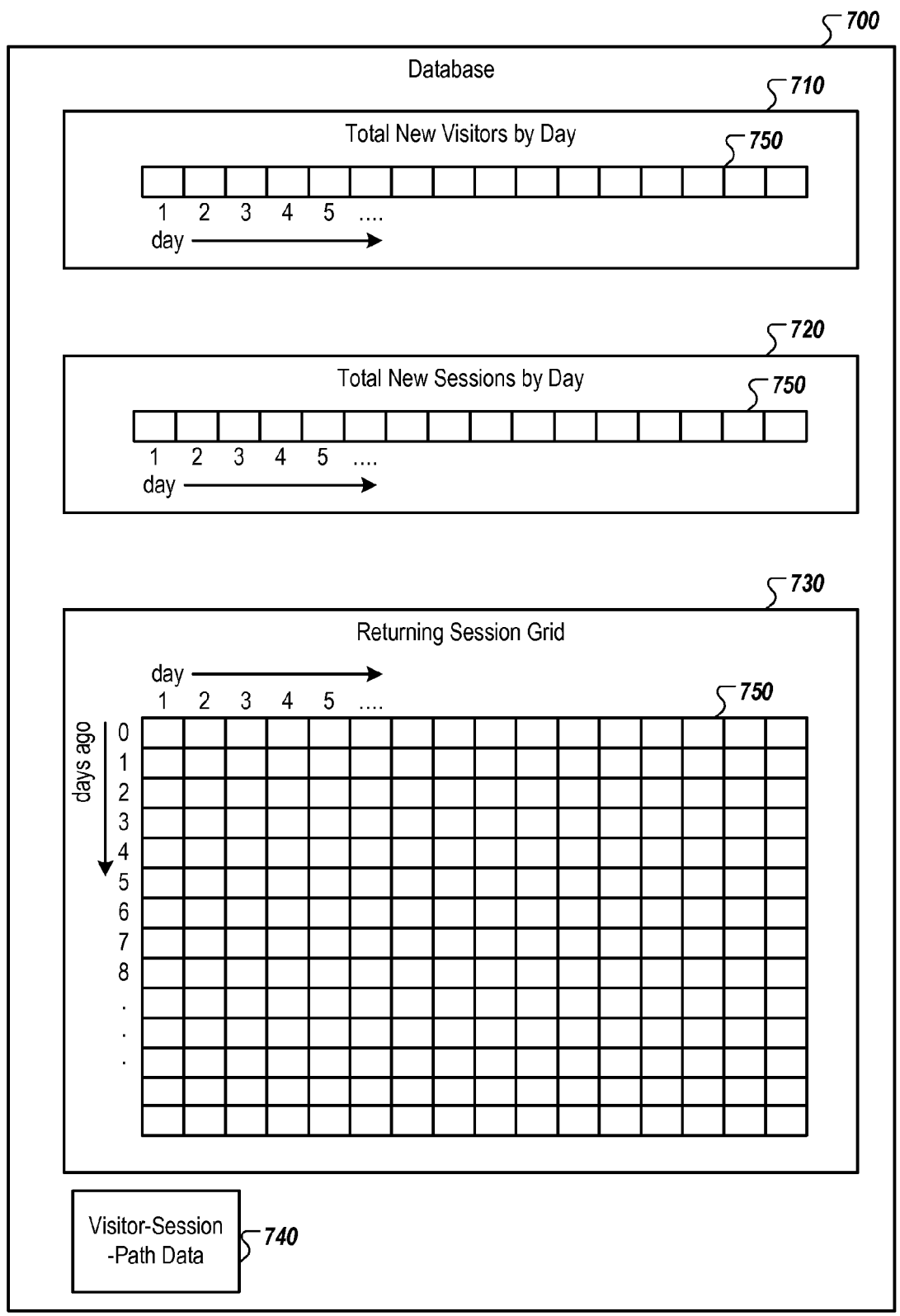
FIG. 7 is a partial block diagram of a preferred embodiment of the database shown in FIG. 1.

FIG. 7 is a partial block diagram of a preferred embodiment of the database 700. The database 700 preferably includes storage for: Total New Visitors by Day 710, Total New Sessions by Day 720, a Returning Sessions Grid 730, and Visitor-Session-Path 740. Total New Visitors by Day 710 stores the total number of new visitors that were identified by the log engine 600 such that, when a new visitor is identified, the storage element 750 for the day it occurred on is incremented by one. Likewise, the Total New Sessions by Day 720 stores the total number of new sessions that were identified by the log engine 600, such that when a new session is identified, the storage element 750 for the day it occurred on is incremented by one. The Returning Session Grid 730 is a two-dimensional array that contains elements 750 of storage for each day. For each day, there are elements of storage for the number "days ago" since the last session. This is used in the loyalty calculations described further below. The visitor-session-path data 740 keeps records for each unique visitor that link to or include records for each session, and the path that was taken through the website 110 during the session.

Figure 8:
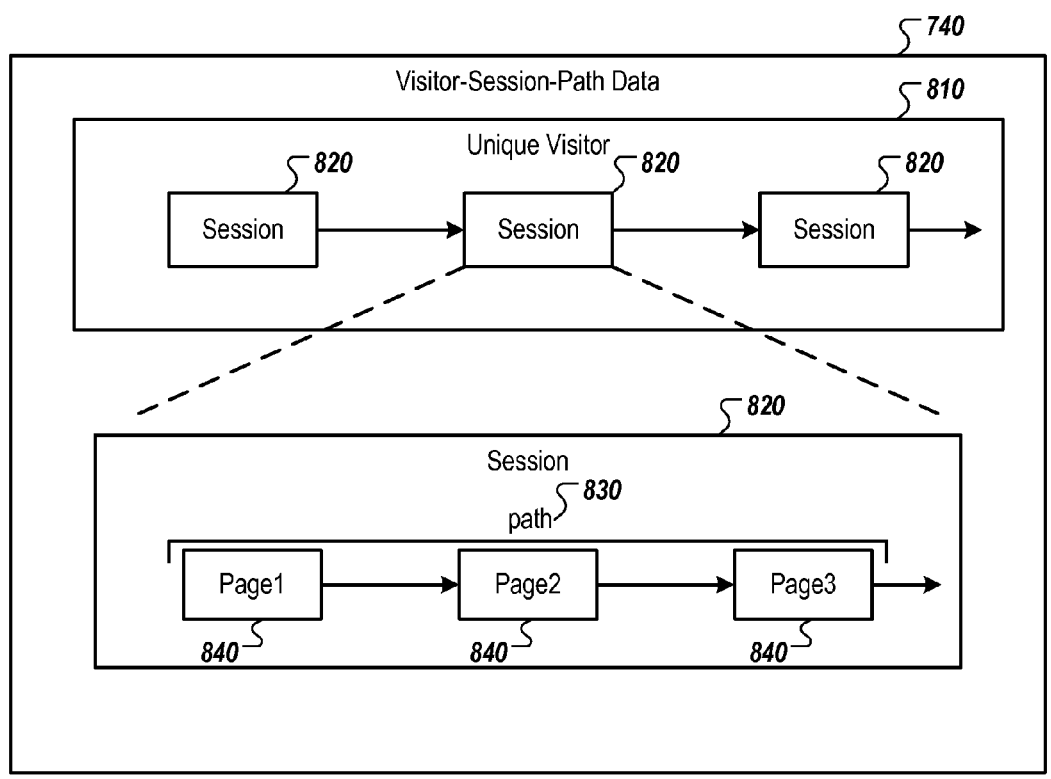
FIG. 8 is a schematic diagram of a preferred storage architecture for the visitor-session-path data component shown in FIG. 7.

FIG. 8 is a schematic diagram of a preferred storage architecture for the visitor-session-path data 740 component of the database 700. This storage contains unique visitor records 810. Each unique visitor record 810 contains or links to a chain of sessions 820 that comprise the visitor's history, in that the visitor 200 may have one or more sessions 820 with the website 120. Each session 820 contains or links to information regarding the path 830 that was taken through the website 120 by the visitor 200. The path 830 identifies each page 840 or file that was seen or downloaded by the visitor.

Referring back to FIG. 6, the Unique Visitor Identification module 610 uses the information provided by the sensor 300 that was sent in the additional request 230, to uniquely identify each visitor represented in the log file 140. The module 610 preferably uses the "unique" and "f-time" variables to create a unique identifier for each visitor. Unique visitor records 810 are stored in the database 700, as shown in FIG. 8. In addition, the module 610 determines when a new visitor has occurred and when a new session has occurred. This is accomplished by comparing the "f-time", "l-time", and "s-time" variables, with the current visitor records 810 and subsequent session records 820, if any.

The "f-time", "l-time", and "s-time" variables hold the timestamps of the visitor's first session, previous session, and current session, respectively. The session records 820 also hold timestamps. The timestamps are compared to see if a new session has occurred that is not yet in the database, and possibly a new visitor record altogether. Alternately, the sensor 300 could flag the occurrence of a new session when certain cookies 400 are expired and reset (FIG. 5). Regardless of the technique, if a new session has been identified, the module 610 will increment the element 750 in the Total New Sessions by Day table 720 (FIG. 7), for the day that the new session began. If a new visitor has been identified, the module 610 will increment the element 750 in the Total New Visitors by Day table 710 for the day that the new session began.

A preferred implementation of the Visitor Loyalty Calculation module 620 (FIG. 6) is triggered when a new session is identified in the previous module. Upon detecting a new session, this module uses the "l-time" and "s-time" variables to determine if there was a previous session and how long ago it was. If the "l-time" and "s-time" variables are the same, then there is no previous session. But, if the "l-time" variable is before the "s-time" variable, then the number of days between the two dates is used to increment the Returning Session Grid 730 (FIG. 7). The "day" is calculated from the "s-time" of the new session. The "days ago" is calculated from the difference between the day of the "l-time" and the day of the "s-time". The appropriate element 750 in the two-dimensional Returning Session Grid 730 is incremented. As will be shown in more detail below, this two-dimensional grid 730 is important for creating unique visitor reports.

A preferred implementation of the Merge Overlapping Data module 630 (FIG. 6) will properly populate the records of the visitor-session-path data 710 shown in FIG. 8. As indicated above, the sensor 300 causes additional requests 230 to be logged in the same log file 140 that the first requests 210 were recorded. This may cause a duplication of certain information. The module 630 preferably identifies the entries in the log file 140 as either coming from the original requests 210 or the additional requests 230. This can be accomplished by looking at the construction of the entry. The sensor-initiated additional requests 230 will have a unique identifier.

Figure 9:
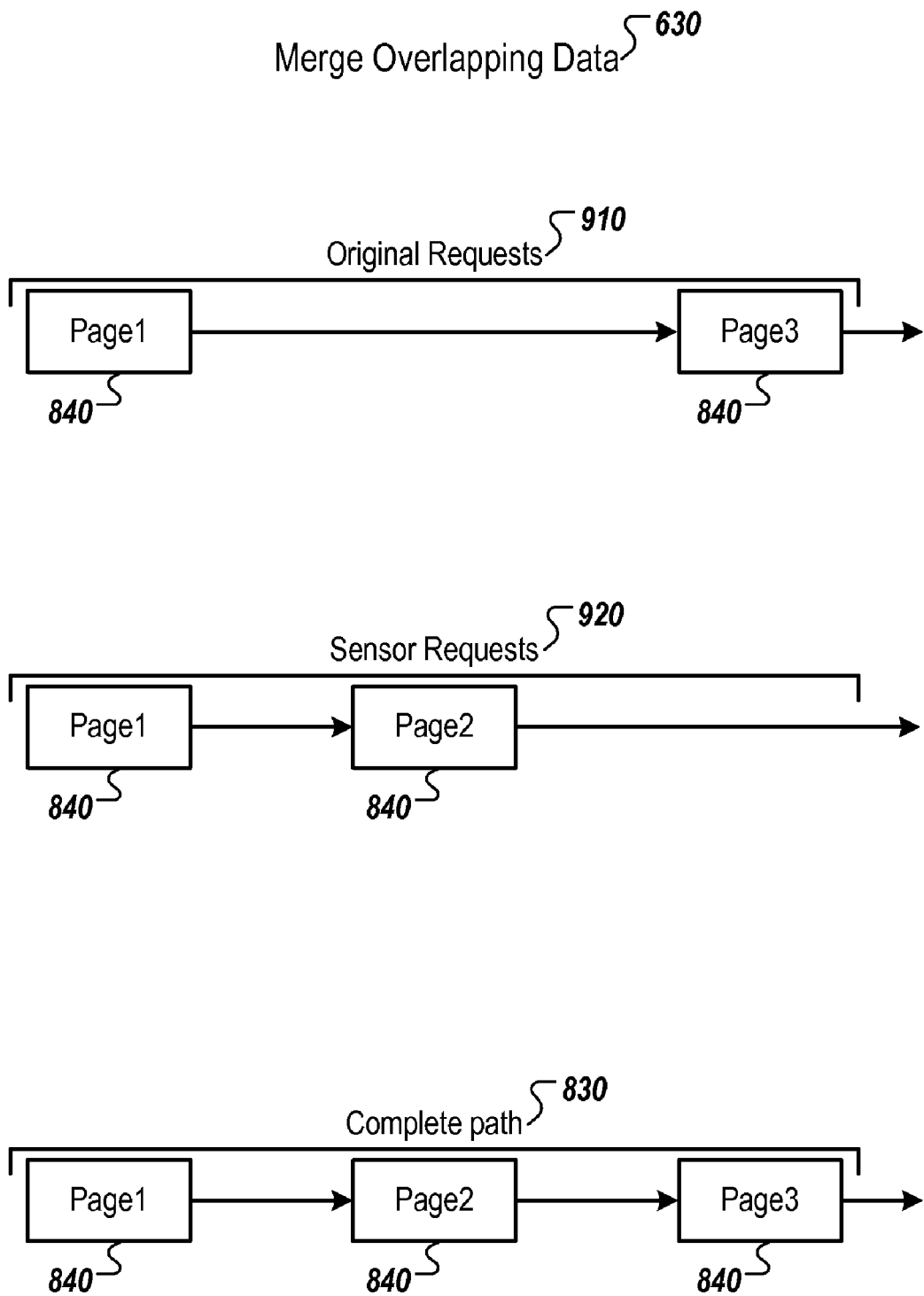
FIG. 9 is a schematic illustration of a preferred method of the merge overlapping data module shown in FIG. 6.
Figure 10:
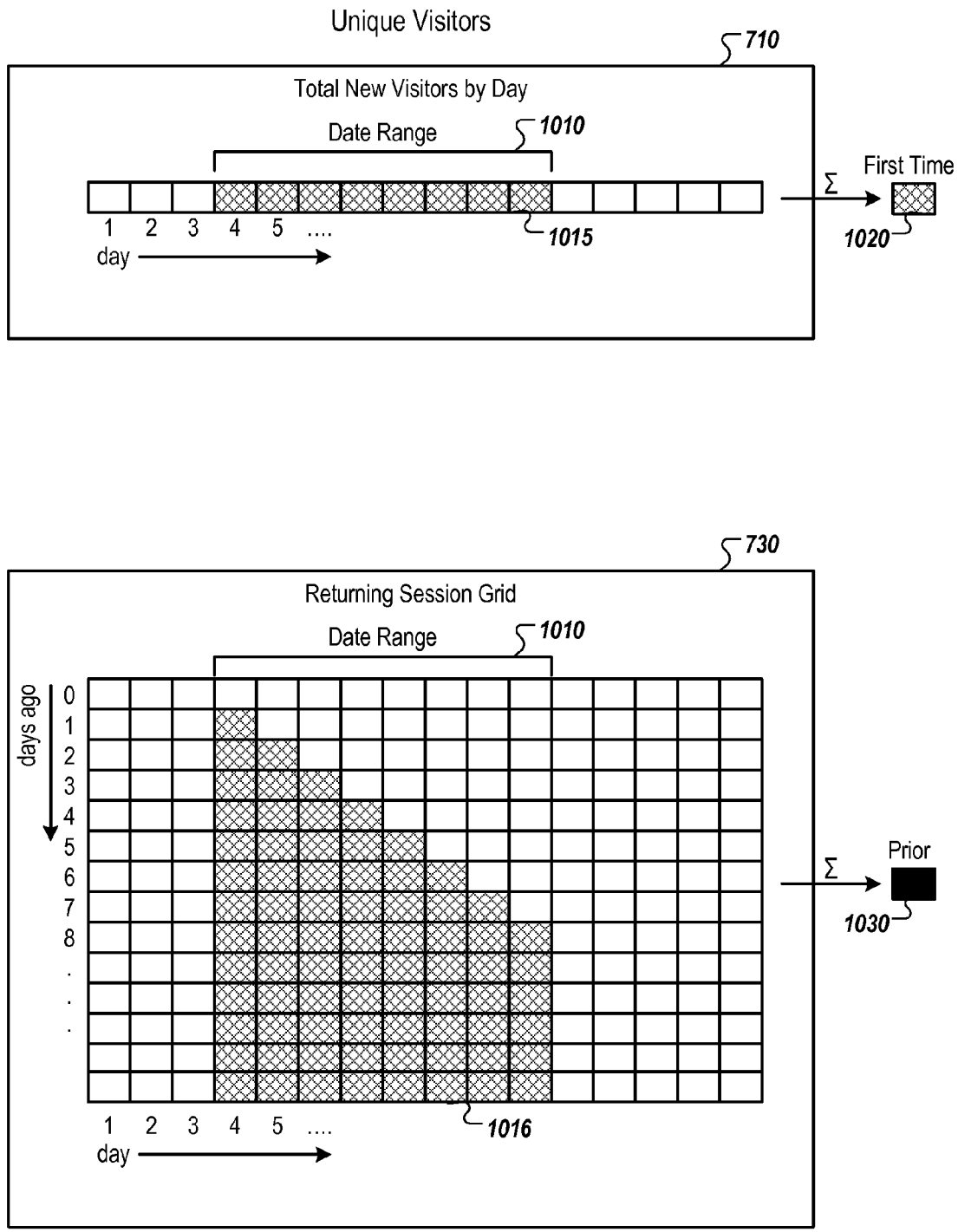
FIG. 10 is a schematic illustration of a preferred method for calculating unique visitors using the tables from FIG. 7.

The Merge Overlapping Data module 630 merges the two types of entries into a complete path 830. As shown in the example in FIG. 9, the path associated with the original requests 910 for a particular session and the path associated with the sensor requests 920 are merged to form a complete path 830. This complete path 830 is the path 830 used for the session 820 shown in FIG. 8. In the example of FIG. 9, the Merge Overlapping Data module 630 determines that "Page 1" 840 is duplicated in both the original requests 910 and the sensor requests 920. The module 630 only makes one entry in the complete path 830 for these two entries. Similarly, the module 630 determines that "Page 2" 840 is only indicated in the sensor requests, and "Page 3" 840 is only indicated in the original requests 910. Using the timestamp and possibly the referral information of the entries, the module 630 creates a complete path 830 that reflects the actual path taken by the visitor.

An aspect of the present invention is the use of both server-side and client-side information channeled through one source to create a more complete picture of a visitor's activity on the website 120. Client-side only systems, such as Internet-based tools, will miss content requested by non cookie-enabled scriptable browsers and content requested for non-scriptable file formats. Server-side only systems, such as prior log-based tools, will miss content intercepted by caching systems and valuable client-side data. The present invention is a log-based tool that augments the log file 140 with additional entries from a client-side sensor 300, creating a more complete picture of total activity on a website.

FIGS. 10-13 demonstrate some preferred features of the reporting engine 1000. The report engine 1000 is preferably adapted to calculate unique visitors for any arbitrary date range, and break this calculation into first-time visitors and prior visitors. This is not a straightforward calculation due to the fact that a visitor may have more than one session during the selected date range. The Returning Session Grid 730 of the database 700 is used in making these calculations. As shown in the schematic diagram of FIG. 10, first time (1020) unique visitors is calculated by adding all of the shaded elements 1015 in the Total New Visitors by Day table 710. The shaded elements 1015 are selected if their day falls within the selected date range 1010 for the calculation. Prior (1030) unique visitors is calculated by adding all of the shaded elements 1016 in the Returning Session Grid 730. The shaded elements 1016 are selected if their day falls within the selected date range 1010 for the calculation and the "days ago" value for the element 1016 is greater than the distance between the element 1016 and the beginning of the date range 1010. This calculation eliminates repeat sessions during the date range and only counts each visitor once. Total unique visitors is simply the addition of first time 1020 unique visitors and prior 1030 unique visitors.

Figure 11:
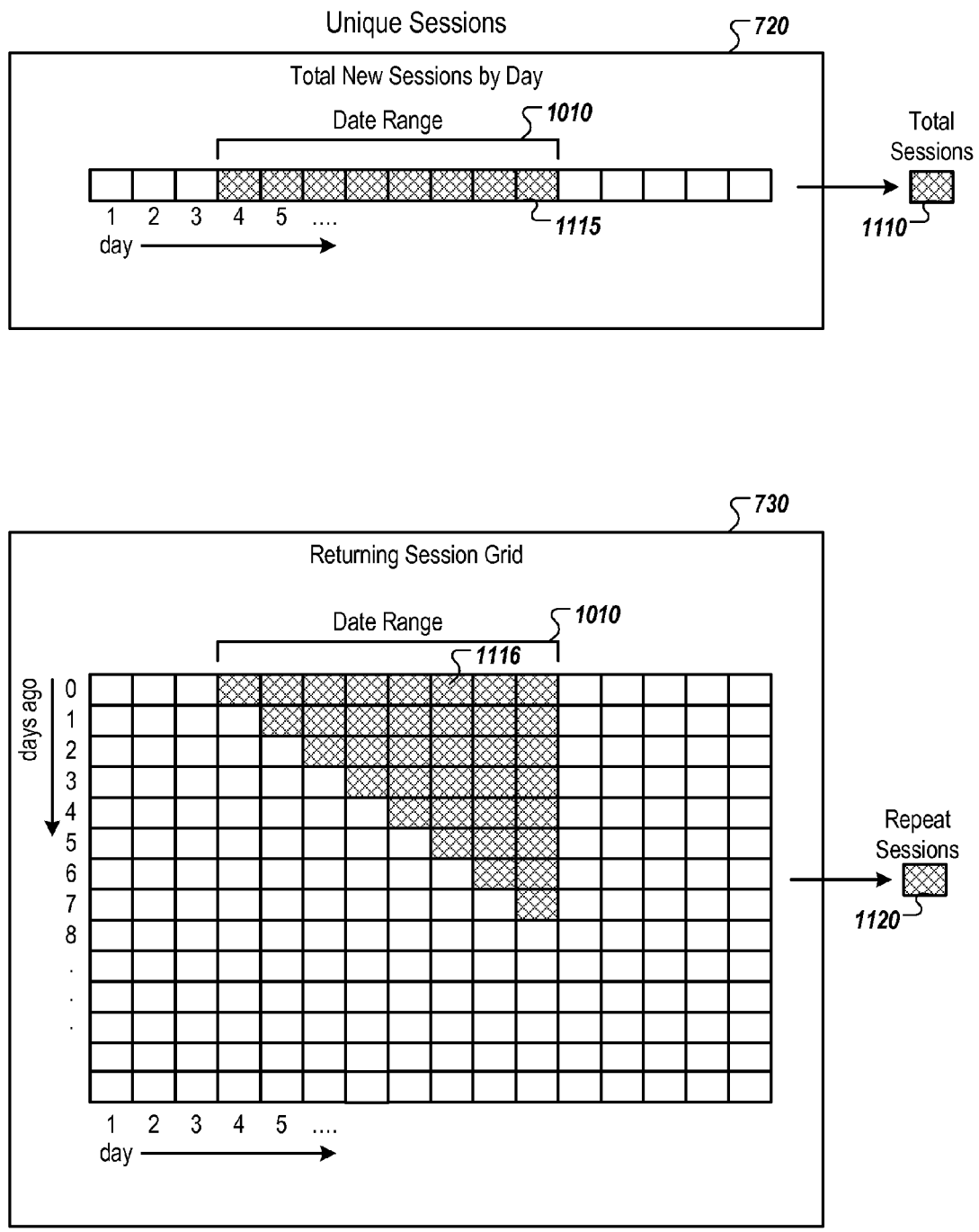
FIG. 11 is a schematic illustration of a preferred method for calculating unique sessions using the tables from FIG. 7.

FIG. 11 is a schematic diagram of a preferred method for calculating total sessions 1110 and repeat sessions 1120 for any arbitrary date range 1010. Total sessions 1110 is calculated by totaling all of the shaded elements 1115 in the Total New Sessions by Day table 720. The shaded elements 1115 are selected if their day falls within the selected date range 1010 for the calculation. Repeat sessions (1120) is calculated by adding all of the shaded elements 1116 in the Returning Session Grid 730. The shaded elements 1116 are selected if their day falls within the selected date range 1010 for the calculation and the "days ago" value for the element 1116 is less than or equal to the distance between the element 1116 and the beginning of the date range 1010.

Figure 12:
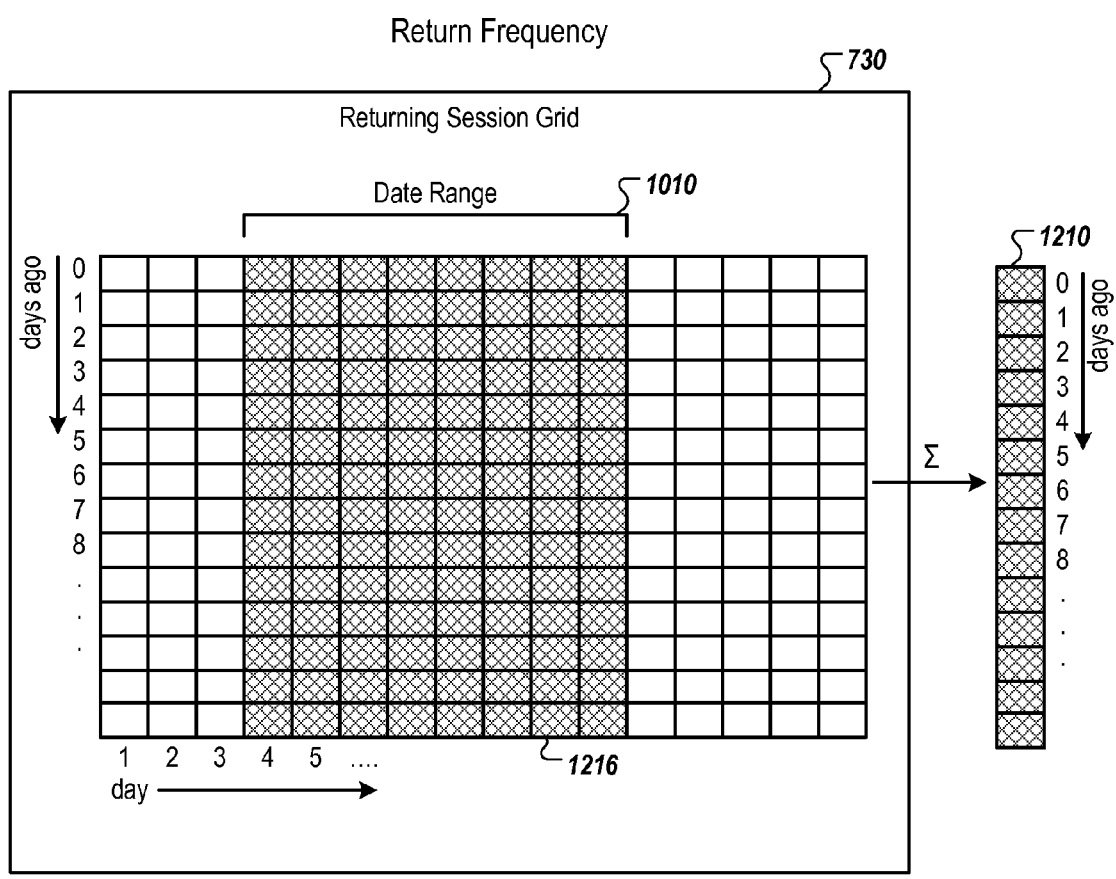
FIG. 12 is a schematic illustration of a preferred method for calculating return frequency using the tables from FIG. 7.

FIG. 12 is a schematic diagram of a preferred method for calculating a return frequency histogram 1210. This calculation comes directly from the Returning Session Grid 730. Each element in the return frequency histogram 1210 is calculated by adding all of the shaded elements 1216 in the same row. The shaded elements 1216 are selected if their day falls within the selected date range 1010 for the calculation.

Figure 13:
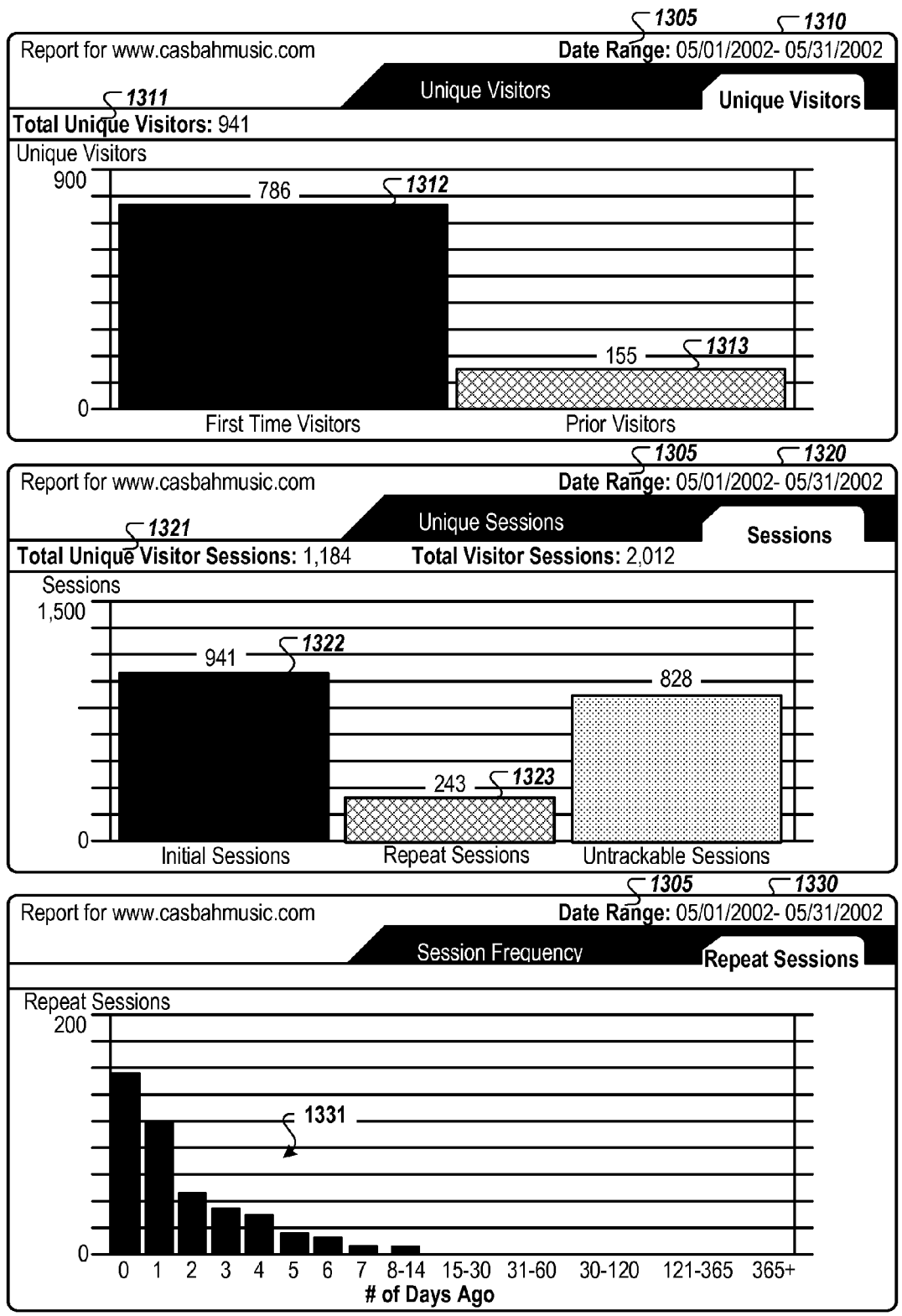
FIG. 13 shows example reports created by a preferred embodiment of the report engine shown in FIG. 1, for the calculations performed in FIG. 10, FIG. 11, and FIG. 12.

By analyzing the ratio between first time 1020 and prior 1030 visitors (FIG. 10), the number of repeat sessions 1120 (FIG. 11), and the returning frequency 1210 (FIG. 12), website owners can begin to understand the loyalty metrics surrounding their visitor traffic. FIG. 13 shows some example reports for these three calculations. The unique visitors report 1310 is calculated for an arbitrary date range 1305. The report 1310 displays the total unique visitors 1311 and the portion that are first time visitors 1312 and the portion that are prior visitors 1313. The sessions report 1320 is calculated for an arbitrary date range 1305. The report 1320 displays the total sessions 1321 and the portion that are unique 1322 and the portion that are repeat sessions 1323. The session frequency report 1330 is calculated for an arbitrary date range 1305. The report 1330 displays the number of sessions 1331 versus the number of days ago for the previous session.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A computer-implemented method, comprising:
   sending to a client, from a server, a web page of a website and a script in response to a first request from the client; and
   receiving, at the server, an additional request from the client, the additional request generated by the script received by the client, the additional request including information from at least one of a plurality of related cookies for the website stored at the client device, the plurality of related cookies for determining a visitor session to the website and including:

a first cookie having a first expiration time and storing data defining two or more client session times with the website; and a second cookie having a second expiration time that occurs before the first expiration time and that defines a client session with the website.

2. The method of claim 1, wherein the additional request is adapted to not be intercepted by a cache/proxy system.

3. The method of claim 1, wherein the additional request is a query that includes a random number that causes the request to not be intercepted by a cache/proxy system.

4. The method of claim 1, wherein the additional request comprises:

a randomly generated value;

data collected from a client browser; and data collected from at least one of the plurality of related cookies.

5. The method of claim 1, wherein the plurality of related cookies comprise a third cookie having an expiration time less than the expiration time of the second cookie and that defines a client session with the website.

6. The method of claim 5, wherein the expiration time of the third cookie is zero.

7. A computer-implemented method, comprising:

sending first data from a server to a client in response to a first request for a web page of a website from the client; and receiving, at the server and from the client, second data that includes information from at least one of a plurality of related cookies for the website stored at the client, the second data being sent in response to the first request, and the plurality of related cookies for determining a visitor session to the website and including:

a first cookie having a first expiration time and storing data defining two or more client session times with the website; and a second cookie having a second expiration time that occurs before the first expiration time and that defines a client session with the website.

8. The method of claim 7, wherein the second data comprise:

a randomly generated value;

data collected from a client browser; and data collected from at least one of the plurality of related cookies.

9. The method of claim 8, wherein the plurality of related cookies comprise a third cookie having an expiration time less than the expiration time of the second cookie and that defines a client session with the website.

10. The method of claim 9, wherein the expiration time of the third cookie is zero.

11. The method of claim 10, wherein the two or more client session times stored in the first cookie include:

a first time value indicating a time of a first session of the client with the website;

a second time value indicating a time of a last session of the client with the website; and a third time value indicating a time of a current session of the client with the website.

12. The method of claim 7, wherein the expiration time of the second cookie defines a session expiration time period for which a client session with the website expires when the client has been inactive during the session expiration time period.

13. A system, comprising:

a server computer; and a memory storage in data communication with the server computer and storing instructions that when executed by the server computer cause the server computer to perform operations comprising:

sending to a client, from a server, a web page for a website and a script in response to a first request from the client; and receiving, at the server, an additional request from the client, the additional request generated by the script received by the client, the additional request including information from at least one of a plurality of related cookies for the website stored at the client device, the plurality of related cookies for determining a visitor session to the website and including:

a first cookie having a first expiration time and storing data defining two or more client session times with the website; and a second cookie having a second expiration time that occurs before the first expiration time and that defines a client session with the website.

14. The system of claim 13, wherein the additional request is adapted to not be intercepted by a cache/proxy system.

15. The system of claim 13, wherein the additional request is a query that includes a random number that causes the request to not be intercepted by a cache/proxy system.

16. The system of claim 13, wherein the additional request comprises:

a randomly generated value;

data collected from a client browser; and data collected from at least one of the plurality of related cookies.

17. A system, comprising:

a computer; and a memory storage in data communication with the server computer and storing instructions that when executed by the server computer cause the computer to perform operations comprising:

sending, to a server, a first request for a web page of a website;

receiving, from the server, the web page and a script in response to the first request; and executing the script, and in response to executing the script:

setting a first cookie having a first expiration time and storing data defining two or more client session times with the website; and setting a second cookie having a second expiration time that occurs before the first expiration time and that defines a client session with the website.

18. The system of claim 17, wherein in response to executing the script the computer performs the operation of setting a third cookie having an expiration time less than the expiration time of the second cookie and that defines a client session with the website.

19. The system of claim 18, wherein the instructions further cause the computer to perform operations comprising:

generating an additional request including information from at least one of a plurality of related cookies for the website; and sending the additional request to the server.

20. The system of claim 19, wherein the additional request comprises:

a randomly generated value;

data collected from a client browser; and data collected from at least one of the plurality of related cookies.

21. The system of claim 18, wherein the two or more client session times stored in the first cookie include:
- a first time value indicating a time of a first session of the client with the website;
- a second time value indicating a time of a last session of the client with the website; and
- a third time value indicating a time of a current session of the client with the website.

22. A computer-implemented method performed by a client device, comprising:
- sending, to a server, a first request for a web page of a website;
- receiving, from the server, the web page and a script in response to the first request; and
- executing the script, and in response to executing the script:
  - setting a first cookie having a first expiration time and storing data defining two or more client session times with the website; and
  - setting a second cookie having a second expiration time that occurs before the first expiration time and that defines a client session with the website.

23. The computer-implemented method of claim 22, further comprising setting a third cookie having an expiration time less than the expiration time of the second cookie and that defines a client session with the website.

24. The computer-implemented method of claim 23, further comprising:
- generating an additional request including information from at least one of a plurality of related cookies for the website; and
- sending the additional request to the server.

25. The computer-implemented method of claim 23, wherein the additional request comprises:
- a randomly generated value;
- data collected from a client browser; and
- data collected from at least one of the plurality of related cookies.

26. The computer-implemented method of claim 23, wherein the two or more client session times stored in the first cookie include:
- a first time value indicating a time of a first session of the client with the website;
- a second time value indicating a time of a last session of the client with the website; and
- a third time value indicating a time of a current session of the client with the website.

* * * * *

UNITED STATES PATENT AND TRADEMARK OFFICE
CERTIFICATE OF CORRECTION

| | | |
|---|---|---|
| PATENT NO. | : 8,150,983 B2 | |
| APPLICATION NO. | : 12/961197 | |
| DATED | : April 3, 2012 | |
| INVENTOR(S) | : Paul N. Muret, Hui Sok Moon and Jonathon A. Vance | |

It is certified that error appears in the above-identified patent and that said Letters Patent is hereby corrected as shown below:

First page, Column 2, Line 1, Under Other Publications, please delete "logile" and insert -- logfile --, therefor.

Signed and Sealed this
Twenty-sixth Day of June, 2012

David J. Kappos
*Director of the United States Patent and Trademark Office*